Figure 1:
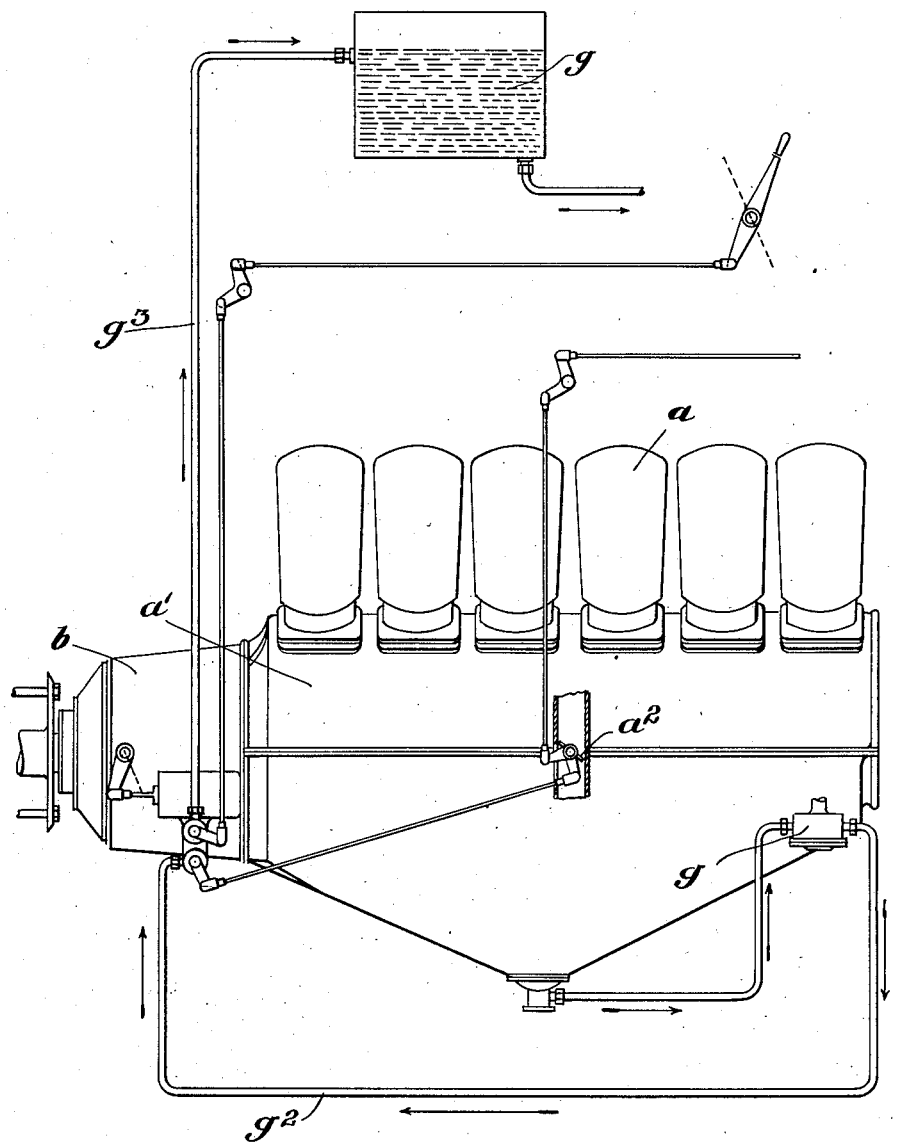

March 4, 1930.  A. J. ROWLEDGE  1,749,264
CHANGE SPEED GEAR
Filed Dec. 3, 1924    3 Sheets-Sheet 1

Inventor
Arthur J. Rowledge
By Barron Fenwick Lawrence,
Attorneys

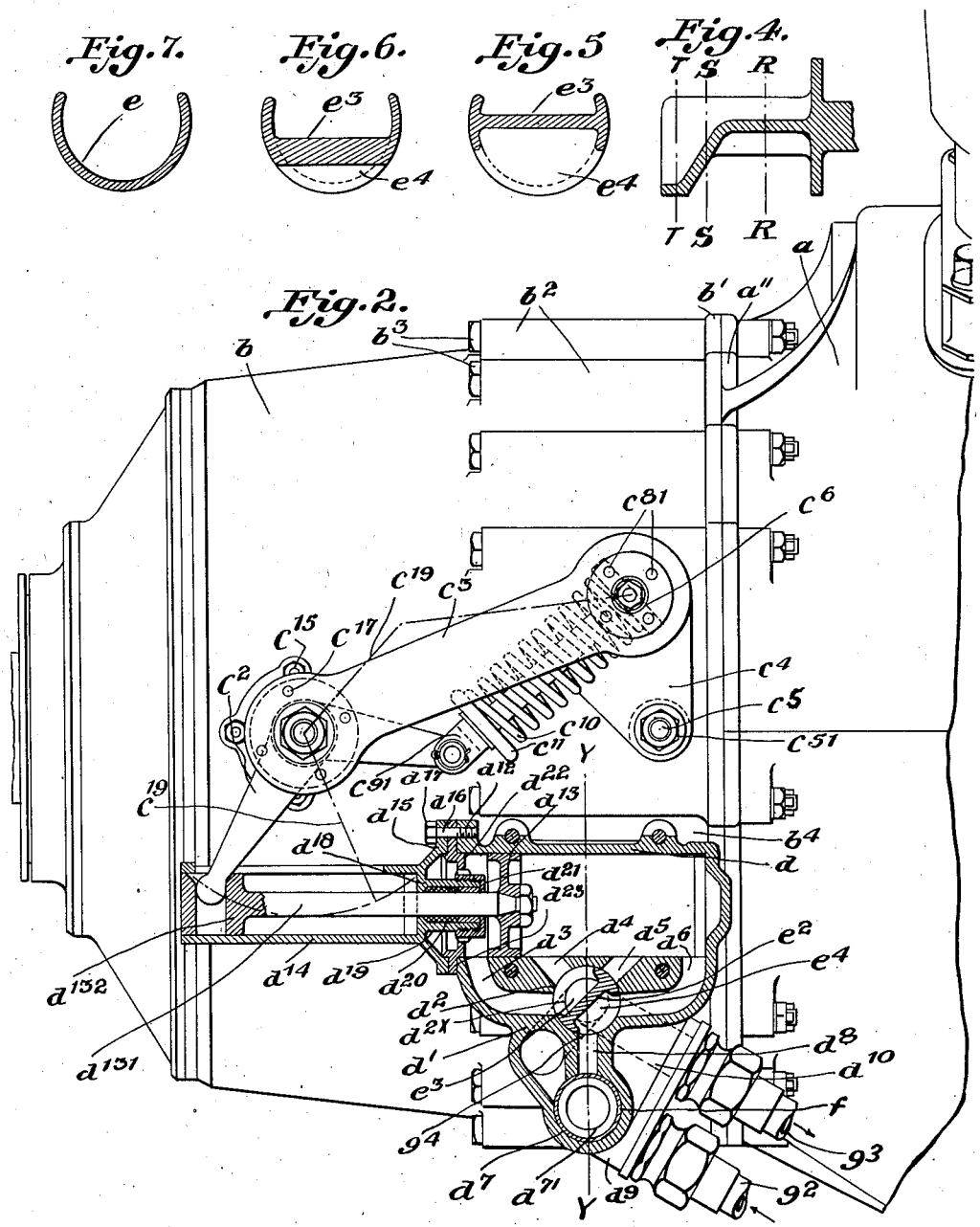

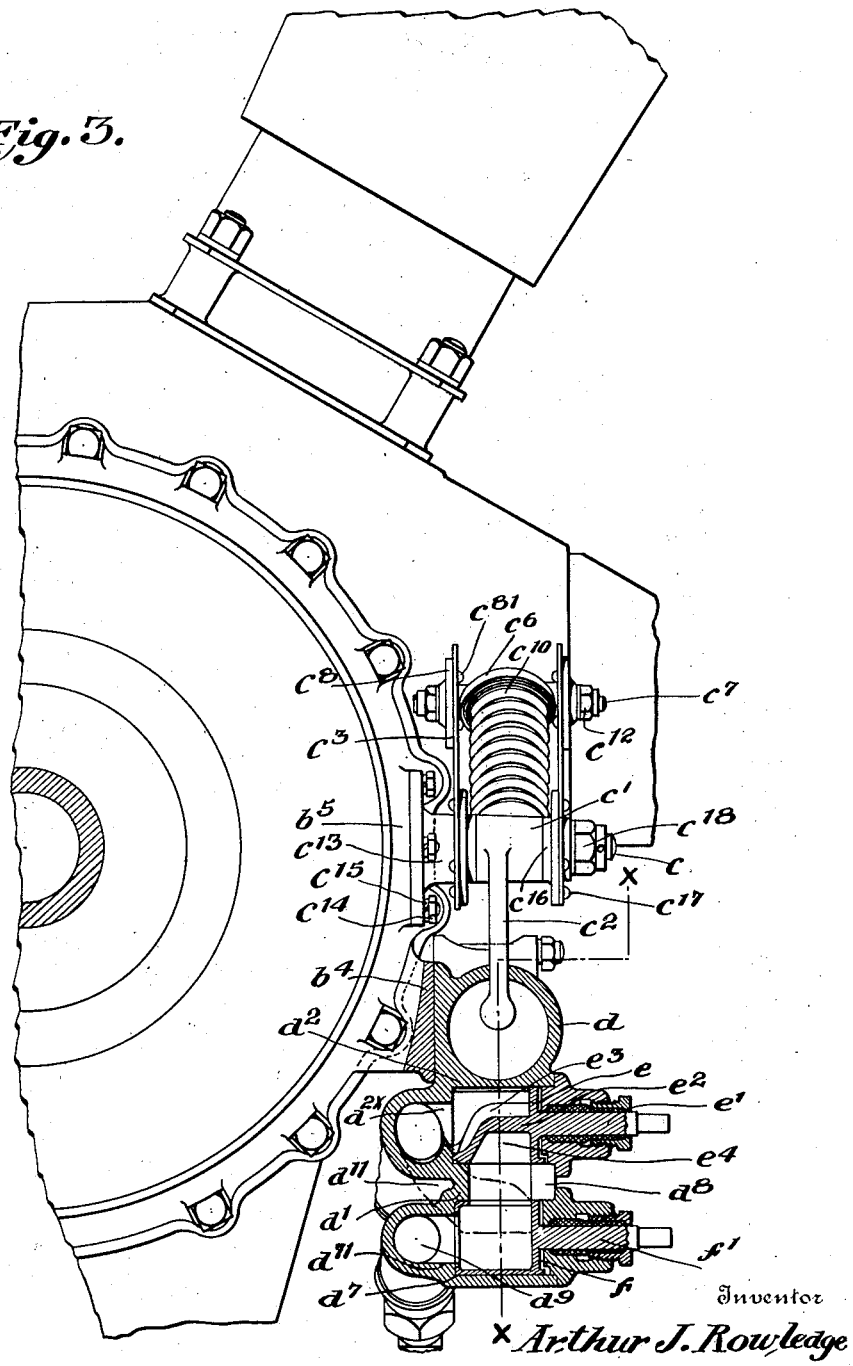

Patented Mar. 4, 1930

1,749,264

UNITED STATES PATENT OFFICE

ARTHUR JOHN ROWLEDGE, OF DERBY, ENGLAND, ASSIGNOR TO ROLLS-ROYCE LIMITED, OF DERBY, ENGLAND

CHANGE-SPEED GEAR

Application filed December 3, 1924, Serial No. 753,692, and in Great Britain December 4, 1923.

This invention relates to change speed gear and is specially useful in aero engines having two-speed gear. The invention is a novel system of changing the gear by hydraulic force. The invention consists in a new hydraulic device in operable connection with the change speed mechanism actuated by the "scavenger" oil under the influence of a force pump with controlling means operable by the driver, the device being so arranged that the relief port of the compression system is closed by the piston, except when the piston is at the end of its stroke, whereby the pump has to overcome the resistance of the members to be moved, but is free from the necessity of overcoming a spring loaded valve of greater resistance. Preferably there is connected to the mechanism a toggle arrangement whereby according to the position of the toggle one or the other of two plate clutches is closed, such clutches being respectively operatively connected to one and the other speed gear.

Preferably also the mechanism is connected to the throttle valve so that except during a predetermined range of throttle opening the operation of the mechanism is suspended.

As an example of this invention I may make the apparatus as follows:—

At a suitable position in the conduit through which used oil is being pumped back to the supply tank (hereinafter called the "return" conduit) is a two-way valve mechanically connected to the throttle valve in such manner that when the throttle valve is open the oil is pumped direct to the supply tank, but when the throttle valve is closed, or closed to a predetermined amount, the oil is delivered via a conduit (hereinafter referred to as the "supply" conduit) to and through an oil pressure system, and thence via a conduit (hereinafter referred to as the "exhaust" conduit) into the return conduit at a point beyond the said valve.

The oil pressure system consists of a presser cylinder with a piston therein and a special valve and a special arrangement of conduits as hereinafter described. The presser cylinder has four openings or ports one at each end beyond the stroke movement of the piston (hereinafter referred to as "end" ports) and two others respectively at such a distance from each end that when the piston makes a full stroke it passes one of such openings early in the stroke and the other shortly before completing the stroke (hereinafter referred to as "inner" ports).

The valve is a multiple way valve to be moved into one or the other of two positions. To it are connected the supply conduit from the return conduit, the exhaust conduit and the conduits from each of the ports of the cylinder. The valve is constructed so that in one position one of the end ports of the cylinder is in through connection with the supply conduit, the adjoining inner port is closed, and the remaining two ports are in through connection with the exhaust conduit and in the other position the converse is brought about, that is to say, the other end port of the cylinder is in through connection with the supply conduit, the adjoining inner port is closed and the other two are in through connection with the exhaust conduit.

To the piston a piston rod is connected which passes out at one end through a suitable packing gland formed in the end of the cylinder.

The piston rod operates on one end of a lever which at the other end is connected to a spring loaded toggle and which, through the instrumentality of a suitable mechanism, causes either the one or the other of two plate clutches to be closed, thus connecting the driving mechanism to one system of gear or another. The effect of the toggle is, firstly, that the hydraulic device has only to reverse the toggle, that is to say push it past the critical or neutral point, and second, that either one or the other of the clutches is closed with a predetermined pressure.

In the accompanying drawings an example of my invention is illustrated.

Fig. 1 is a diagrammatical view showing the working of the device on a 12 cyinder engine. Fig. 2 an enlarged view of the change speed case showing in section on a central vertical plane the presser cylinder and valves on line XX of Fig. 3. Fig. 3 is a front view showing the presser cylinder and valves in section on line YY of Fig. 2 looking from left to right. Figs. 4, 5, 6 and 7 are respectively a central vertical section of the barrel of a multiple way barrel valve and sections on lines R S and T of Fig. 4. $a$ are the cylinders, $a^1$ the crank shaft case with flange $a^{11}$ and $a^2$ is the throttle valve. $b$ is the case containing the change speed mechanism with flange $b^1$ secured to the crank shaft case by bolts passing through the flange $a^{11}$ and passing through bosses $b^2$ formed on the change speed case and nuts $b^3$. $b^4$ is a facing formed on the case $b$ to support the presser cylinder hereinafter described and $b^5$ is a boss on the case through which the shaft hereinafter described protrudes. $c$ is a rocking shaft the rotating of which through an arc actuates the change speed mechanism, extending from within the casing through the boss $b^5$ and through holes in the two seel plates hereinafter referred to, $c^2$ is a two arm toggle lever the arms being projected from a hub $c^1$ keyed to shaft $c$, $c^3$ are two steel plates the inner having an extension $c^4$ secured to the casing $b$ by stud and nut $c^5$ and $c^{51}$. $c^6$ is a flat circular member formed with shouldered trunnions $c^7$ which are threaded at their ends. These trunnions pass through holes in the plates $c^3$ and are mounted and rock in steel bearings $c^8$ which are secured to the plates $c^3$ by rivets $c^{81}$, $c^9$ is a rod which at one end passes through and slides in a hole in the centre of the circular member $c^6$ and at the other end has a bifurcated end piece $c^{91}$ pivotally hinged to an arm of the toggle lever. $c^{10}$ is the toggle spring abutting at one end against the circular member $c^6$ and at the other end against a perforated circular member $c^{11}$ threaded on the rod $c^9$ and resting on a flange on the bifurcated end piece, $c^{12}$ are nuts securing the trunnions $c^7$ in their bearings, $c^{13}$ is an annular member secured to the boss $b^5$ by bolts $c^{14}$ and nuts $c^{15}$, $c^{16}$ are two annular flanged members, the main parts fitting holes through the two plates respectively, and the flanges laying against the plates and fastened thereto by rivets $c^{17}$. $c^{18}$ is a nut engaging the shaft $c$ and securing the parts in position. The lines $c^{19}$ show the resting position of the toggle lever alternative to that shown in the drawings. The operation of the toggle is as follows:—When the piston moves one arm of the toggle lever $c^2$, turning the shaft $c$ in doing so, the other arm of the toggle lever is moved to the position shown by line $c^{19}$ and for the first half of such movement pushes the rod $c^9$ against the reaction of the spring $c^{10}$ (the rod sliding through the hole in the member $c^6$). Directly the arm of the toggle lever to which the rod is attached has passed the position of alignment with such rod, the reaction of the spring forces such arm to the position shown by the line $c^{19}$. In result the lever $c^2$ must assume one or the other of the extreme positions of its range of movement. $d$ is a presser cylinder formed with a large boss $d^1$ integral therewith extending from end to end of the cylinder, $d^2$ is a transverse bore in such boss to receive a barrel valve hereinafter described and $d^{2x}$ a continuation thereof with smaller diameter, $d^3$, $d^4$, $d^5$ and $d^6$ are conduits leading from the cylinder to the said bore, $d^7$ is another transverse bore and $d^{71}$ a continuation thereof with smaller diameter. $d^8$ is the supply conduit leading from bore $d^2$ to bore $d^7$. $d^9$ is an inclined bore (shown in dotted lines in Fig. 2) opening into the bore $d^{71}$ to which the conduit from the pump is connected, $d^{10}$ is another inclined bore opening into the bore $d^{2x}$ shown in dotted lines in Fig. 2 to which the conduit to the tank is connected. $d^{11}$ is passage way from the bore $d^7$ to the bore $d^{10}$. This passage way is shown in chain dotted lines in Fig. 3 being in front of the section plane. The passage way starting from bore $d^7$ comes upwards from the surface of the paper, bears to the left and then recedes and joins the bore $d^{10}$. $d^{12}$ is a flange formed on and integral with the cylinder $d$ and with threaded holes therein. $d^{13}$ is the piston rod attached thereto with an enlarged cylindrical end $d^{132}$ sliding in a tubular guide constituted by the member $d^{14}$ hereinafter referred to. The enlarged end has a hole or socket therein which is engaged by the ball end of the toggle lever. $d^{14}$ is a tubular member having integral therewith a flange extension $d^{15}$ with holes registering with the threaded holes of the flange $d^{12}$ and secured to the cylinder by studs $d^{16}$ and nuts $d^{17}$. $d^{18}$ is an internal flange also integral with the tubular member $d^{14}$, with a cylindrical extension formed thereon $d^{19}$, forming a stuffing box, $d^{20}$ is packing material. $d^{21}$ is a cap internally threaded to engage external threads on the cylindrical extension $d^{19}$ (by the screwing of which the packing can be compressed as required) with a central hole for the rod to pass through and with external axial serrations, $d^{22}$ is an annular member internally serrated engaging the serrations on and forming a locking plate, for, the cap $d^{21}$ located and secured by a flange $d^{23}$, which is held between the flanges of the cylinder and the tubular member. $e$ is a barrel valve in the bore $d^2$, $e^1$ the spindle actuating it under the control of the driver. One end of the barrel is open. There is a diaphragm $e^2$ running from the other end for nearly the whole length when the diaphragm falls away as shown in Fig. 3 merging in the circumferential wall so that oil on one side $e^3$ of the diaphragm can always escape at the open end. On the other side $e^4$ of the diaphragm there is a gap in the circumferential wall which registers respectivey either with the mouths of the conduits $d^8$ and $d^3$ or of the conduits $d^8$ and $d^6$ according to the position of the valve. $f$ is a barrel valve in the bore $d^7$ and $f^1$ the spindle actuating same. The barrel is open at one end and has a gap in its circumferential wall which registers with the orifice of the conduit $d^8$ or of the bye-pass conduit $d^{11}$ according to the position of the valve. The spindle $f^1$ is mechanically connected to, and is automatically actuated by, the throttle mechanism so that the "gap" opening is registered with the bye-pass when the opening of the throtte valve is above a predetermined limit and with the conduit $d^8$ when below that limit. $g$ is the oil pump returning the oil from the engine sump to the tank $g^1$, $g^2$ is a conduit from the pump $d$ connected to the end of the bore $d^7$, $g^3$ is a conduit leading from the open end of the bore $d^2$ to the tank and $g^4$ shown in dotted lines (Fig. 2) is a continuation of the bye-pass conduit $d^{11}$ connecting with the conduit $g^3$.

The effect of the described apparatus is that when the throttle is opened to a predetermined amount the oil passes direct to the tank via the return conduit constituted by pipe $g^2$, bore $d^9$, valve $f$, passage $d^{11}$, passage $g^4$, bore $d^{10}$ and pipe $g^3$: but when the throttle opening is less than the said predetermined amount the oil passes by the return conduit to the barrel $f$, suppy conduit or passage $d^3$, the side $e^4$ of the barrel valve $e$, thence (dependent on the position of barrel valve $e$) by either the conduit $d^3$ or the conduit $d^6$, the presser cylinder, and either the conduit $d^4$ or the conduit $d^5$, the side $e^3$ of barrel valve $e$, exhaust conduit or bore $d^{2x}$ and the return conduit.

What is claimed is:—

1. An engine controlled by a throttle valve and including a shaft rotatable from either of two different predetermined positions to the other, operating means connected to said shaft, a spring toggle mechanism connected to said operating means and normally tending to hold the shaft in one or the other of its said positions, a servo-motor operably connected to said toggle mechanism, and means controlling the operation of said throttle valve and servo-motor.

2. An engine having a gear casing connected thereto and having a shaft rotatable from either of two different predetermined positions to the other, a bell crank lever operatively connected to said shaft, a link slidably and pivotally connected to said casing and having one end thereof pivoted to one arm of said lever, yielding means connected to said link to maintain said lever in a predetermined operative position, mechanism engaging the other arm of said lever to move in opposite directions against the resistance of said yielding means, a throttle valve controlling the operation of said engine, manually operable means controlling the operation of said mechanism, and means controlled by the throttle valve during a predetermined range of throttle opening to suspend the operation of said mechanism.

In witness whereof I have signed this specification.

ARTHUR JOHN ROWLEDGE.